Sept. 8, 1964        M. W. ROSE ETAL        3,148,349
ELECTRICAL TEMPERATURE REPRODUCER Filed May 29, 1963        2 Sheets-Sheet 1

WITNESSES:
Bernard R. Gieguey
James F. Young

INVENTORS
Merrill W. Rose and
Edmund W. Kuhn.
BY
F. E. Browder
ATTORNEY

Sept. 8, 1964   M. W. ROSE ETAL   3,148,349
ELECTRICAL TEMPERATURE REPRODUCER
Filed May 29, 1963   2 Sheets-Sheet 2

United States Patent Office 3,148,349
Patented Sept. 8, 1964

3,148,349
ELECTRICAL TEMPERATURE REPRODUCER
Merrill W. Rose, Hartford Township, Trumbull County, Ohio, and Edmund W. Kuhn, Hickory Township, Mercer County, Pa., assignors to Westinghouse Electric Corporation, Pittsburgh, Pa., a corporation of Pennsylvania
Filed May 29, 1963, Ser. No. 284,233
3 Claims. (Cl. 338—31)

This invention relates in general to temperature simulation devices and more particularly to so-called hot spot coils for electrical apparatus.

In the operation of electrical apparatus such as transformers, it is desirable to remotely simulate the temperature of a working portion of the electrical apparatus for purposes of measurement and control. A device taught by the prior art is the so-called hot spot coil which contains a temperature simulation chamber exposed simultaneously to the heat produced by an electric coil carrying a current proportional to the electrical load on the electrical apparatus and to the heat of the coolant of the electrical apparatus. If the total heat supplied to the temperature simulation chamber is properly balanced between the heat supplied by the coolant of the electrical apparatus and the heat supplied by the electric coil, the temperature in the temperature simulation chamber will closely follow the temperature in the interior or hottest spot of the electrical apparatus.

A hot spot coil is designed to keep a temperature-sensing element such as a thermometer at the same temperature difference above the temperature of the coolant of the electrical apparatus as the temperature of the electrical apparatus hot spot is above the coolant temperature for any continuous load. This temperature simulating device will then reproduce the hot spot temperature of the electrical apparatus at any continuous load. (If the thermal time constant of the hot spot coil is lower than the thermal time constant of the electrical apparatus, the temperature in the hot spot coil may rise above that of the actual hot spot in the electrical apparatus immediately after a sudden load increase; the hot spot coil will then, in effect, anticipate the hot spot temperature which will be reached in the electrical apparatus.) A temperature-sensing element may be placed in the hot spot coil to indicate temperature, to operate alarms, to turn on fans, to turn on pumps, to trip circuit breakers, or to perform any other function which may be desirable to protect the electrical apparatus such as a transformer from excessive internal heat.

One method of testing these temperature simulating devices or so-called hot spot coils is to immerse the coil in hot oil of known temperature. An electric current of constant magnitude is then passed through the coil. The temperature difference between the hot oil and the hollow center of the coil is then measured. If the temperature difference falls outside of a predetermined range the coil is rejected. The temperature range specified is usually quite narrow because the temperature simulating devices must be interchangeable for replacement purposes. Because of unavoidable irregularities in the manufacture of a hot spot coil and its electrical and thermal insulation, a certain percentage of hot spot coils so tested must be rejected.

Accordingly, it is the general object of this invention to provide a temperature reproducer which will accurately reflect the temperature at a remote point.

It is a more particular object of this invention to provide a new and improved temperature simulation chamber of the electrical coil type which may be adjusted.

It is yet another object of this invention to provide a new and improved temperature simulation chamber of the electrical heating coil type which has a calibrated adjustment.

Other objects of this invention will in part be obvious and will, in part, appear hereinafter.

Briefly, the present invention accomplishes the above-cited objects by providing a temperature simulation chamber of the electrical heating coil type in which the thermal insulation associated with the electrical heating coil may be varied. More specifically, the electrical heating coil surrounding the temperature simulation chamber is fitted with a movable sleeve, shroud or shielding member which may be moved to vary the exposure of the electrical coil to the ambient temperature.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Because of the difficulty in directly measuring temperatures in the interior of current carrying electrical apparatus it is desirable to simulate these temperatures at some remote point. It has been found that a chamber subjected to the same cooling medium as the electrical apparatus, and surrounded by an electrical coil carrying a current proportional to the current in the electrical apparatus, will closely follow the temperature at the interior or hot spot of the electrical apparatus. As previously mentioned, due to certain non-uniformities in manufacture it is not possible to make every electric coil alike as to thermal characteristics.

Figure 1:
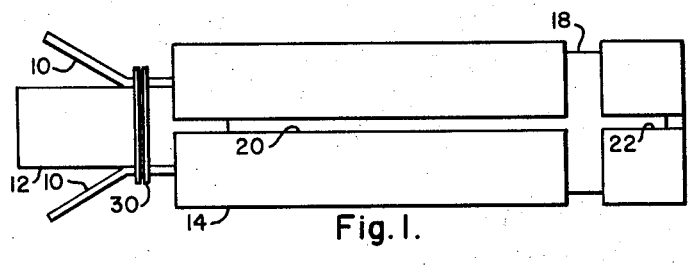
FIGURE 1 is a side elevation of one embodiment of the invention.
Figure 2:
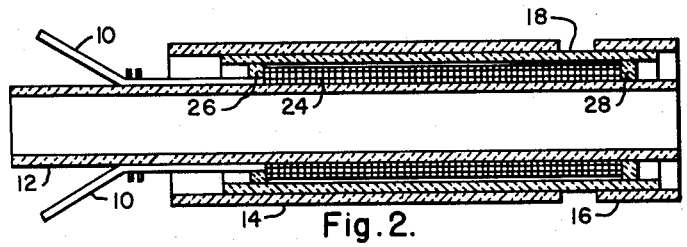
FIG. 2 is a vertical transverse sectional view of FIG. 1.

Referring now to the drawings and FIGS. 1 and 2 in particular, one may see how we have overcome this difficulty by providing a temperature simulation chamber or hot spot coil with an adjustable thermal impedance between the inside and the outside of the hot spot coil. A tube 12 is provided inside of an electrical heating coil 24. Electrical leads 10 are brought out from the electrical heating coil 24 for connection to the electrical device (not shown) whose temperature one wishes to simulate. The tube 12 and the electrical heating coil 24 may be held in fixed spaced relation by means of collars or washers 26 and 28. The leads 10 may be secured to the tube 12 by means of thread 30. A second tube 18 is provided external to the electrical heating coil 24. Tube 18 is held in fixed spaced relation to the electrical heating coil 24 and to the central tube 12 by means such as collars or washers 26 and 28. A third tube, comprising tube segments 14 and 16, is provided exterior to and coaxial with tube 18.

In the testing and adjustment operation of the invention, the segment 16 of the outermost tube is attached to intermediate tube 18 by any suitable means such as gluing or welding. The segment 14 of the outermost tube is slidably mounted so that it may be moved axially along intermediate tube 18 exposing more of the exterior surface of the intermediate tube 18 to the ambient temperature until the temperature difference between the inside of central tube 12 and the outside of outermost tube segment 14 is within the desired range. Tube segment 14 may then be permanently attached to intermediate tube 18 by any suitable means such as gluing. The outer tube segments 14 and 16 may each be cut with longitudinal slits 20 and 22 so that the outer tube segments 14 and 16 will exert a clamping action on intermediate tube 18. Tube segment 16 serves as a stop for tube segment 14.

Figure 3:
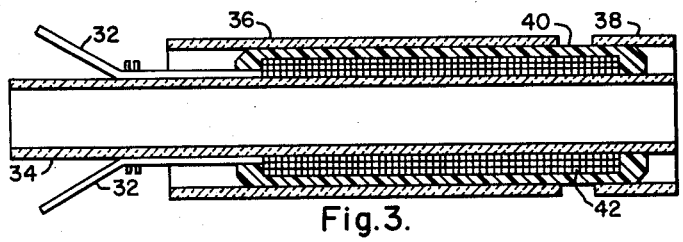
FIG. 3 is a vertical transverse sectional view of an embodiment of the invention employing an electric coil cast in a resin.

Referring to FIG. 3 of the drawing, one may see an embodiment of our invention in which a tube 34, which may be either a thermal insulator or thermal conductor, is provided in the center of a hollow electric heating coil 42. The heating coil 42 is encapsulated with a resinous bonding compound 40. Electrical leads 32 are provided to connect the electrical heating coil 42 to a voltage source (not shown). Over the resinous bonding compound 40 we provide an outer tube comprising tube segments 36 and 38.

In the testing and adjustment operation of this embodiment of the invention, tube segment 38 is attached to the resinous covering 40 of the electrical heating coil 42 by suitable means such as gluing or fusing. The entire device is then inserted in a metal instrument well (not shown) which is surrounded by an oil bath (not shown). The temperature of the oil bath is maintained constant. An electrical current of predetermined value is maintained in the electrical heating coil 42. After a period of seasoning, the temperature of the oil bath and the temperature inside the central tube 34 are compared. If the difference between these two temperatures does not fall within the desired range, the movable segment 36 of the outer tube is moved axially along the resinous coating 40 of the electrical heating coil 42 exposing more of the exterior surface of the electrical heating coil 42 to direct radiation and conduction of heat from the metal instrument well (not shown). When the desired temperature difference between the inside of tube 34 and the oil bath (not shown) is achieved, the movable sleeve segment 36 may be fastened to the resinous coating 40 of the electrical coil 42 by any suitable means such as gluing or fusing.

It will be understood that in the normal operation of a temperature simulation chamber or hot spot coil, the temperature in the central tube of the chamber is the sum of the heat conducted to the chamber from the ambient temperature and the heat supplied by the electrical heating coil. The heat supplied by the electrical heating coil 42 is constant at constant electric current, hence, the adjustment of the temperature inside the temperature simulation chamber is achieved by exposing more or less of the exterior surface of the electrical heating coil 42 to the ambient temperature in the electrical apparatus whose interior temperature is being remotely simulated.

Figure 4:
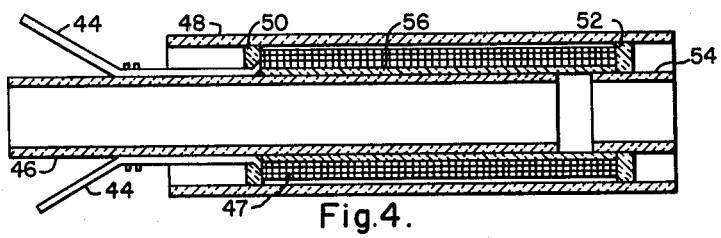
FIG. 4 shows a vertical transverse sectional view of an embodiment of the invention with an internal adjustment sleeve.

Referring to FIG. 4 of the invention, there is illustrated an embodiment of the invention in which an adjustment sleeve or tube 46 is located inside the electrical heating coil 47 rather than on the outside of the heating coil as in previously described embodiments of the invention. Electrical leads 44 are provided to connect the electrical heating coil 47 to a voltage source (not shown). The electrical heating coil 47 is surrounded by an outer tube 48. A tube 56 is provided inside the electrical heating coil 47. The inner and outer tubes 56 and 48 may be held in fixed spaced relation to the electrical heating coil 47 by means of toroidal washers 50 and 52. A movable sleeve or tube 46 is also positioned inside of the hollow electrical heating coil 47. A fixed section of tubing 54 may be provided as a stop to prevent the movable sleeve or tube 46 from extending through the right-hand end of the device.

In the testing and adjusting operation, adjustment of the device to achieve the desired temperature difference between the interior of tube 46 and the outside of tube 48 is achieved in the same manner as described with reference to FIG. 3, except that a variable exposure of the interior of tube 46 to the ambient temperature is achieved with a movable sleeve 46 inside the hollow electrical heating coil 47 rather than on the outside of the hollow electrical heating coil 47.

Figure 5A:
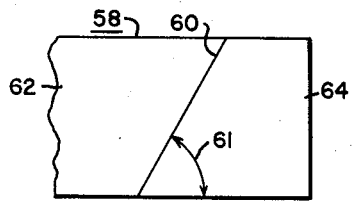
FIG. 5A is a partial side elevation view of an embodiment of the invention with an external adjustment sleeve in the closed position.
Figure 5B:
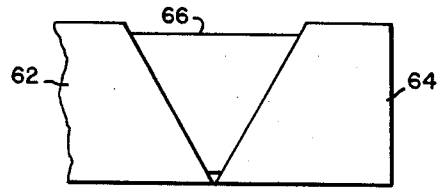
FIG. 5B is a partial side elevation view of the embodiment of the invention illustrated in FIG. 5A with the external adjustment sleeve rotated to its position of maximum opening.

Referring to the drawings, and in particular to FIGS. 5A and 5B, there is illustrated partial side elevation views of an embodiment of the invention in which the direct exposure of a hollow tubular electrical heating element 66 to the ambient temperature is achieved by a rotary adjustment.

In FIG. 5A, the adjustment means is shown in its fully closed position. A cylindrical tube 58 is cut at an angle 61 of other than 90° to the longitudinal axis of the tube 58 producing a slit 60. One segment 64 of the tube 58 is fastened by glue or other means to the outside of the hollow electrical heating element 66. Another segment 62 of the tube 58 is mounted free to rotate about the outside of hollow tubular electrical heating element 66. When rotatably mounted, cylindrical tube segment 62 is rotated in either a clockwise or counterclockwise direction, the upper right hand corner of tube segment 62 will engage the angle cut end 60 of fixed tube segment 64, and move the tube segment 62 axially to the left exposing a portion of hollow heating element 66.

In FIG. 5B, the rotatably adjustable modification of the invention is shown in the maximum position of exposure of the exterior surface of the hollow electric heating element 66.

Figure 6A:
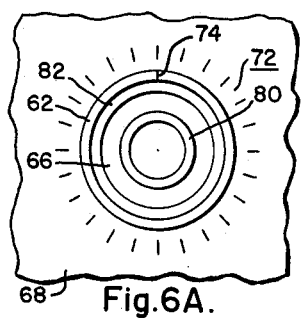
FIG. 6A is a partial view in end elevation of the closed embodiment of the invention illustrated in FIG. 5A installed in a heat producing electrical apparatus.
Figure 6B:
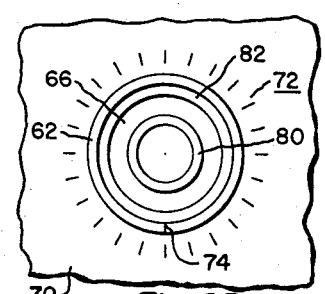
FIG. 6B is a partial view in end elevation of the embodiment of the invention illustrated in FIG. 5B in its position of maximum exposure in a heat producing electrical apparatus.

Referring to FIGS. 6A and 6B of the drawings, there are illustrated end elevation views of the embodiment of the invention as described with reference to FIGS. 5A and 5B. The hollow electrical heating element 66 may have a central tube 80 to prevent the windings of the hollow electrical heating element 66 from becoming abraded when temperature measuring devices are inserted or withdrawn from the center of a hollow electrical heating element 66. The hollow electrical heating element 66 may also be covered with a tube 82 of an electrically insulating material. The rotatable tube segment 62 has an index mark 74 to indicate on a scale 72 how much of the exterior surface of the hollow electrical heating element 66 is exposed to the ambient temperature.

In FIG. 6A, the index mark 74 indicates on scale 72 that the rotatable tube segment 62 is exposing none of the exterior surface of the hollow electrical heating element 66.

In FIG. 6B, the index mark 74 indicates on scale 72 that the maximum exterior surface of the hollow electric heating element 66 is exposed to the ambient temperature by the rotation of 180° in the clockwise direction of the rotatable tube segment 62. By the use of scale 72, the tester of the hot spot coils can detect differences in the manufacture of successive coils by the amount the index mark 74 has to be moved to achieve the desired temperature difference between the interior of tube 80 and the exterior of tube 62.

Figure 7:
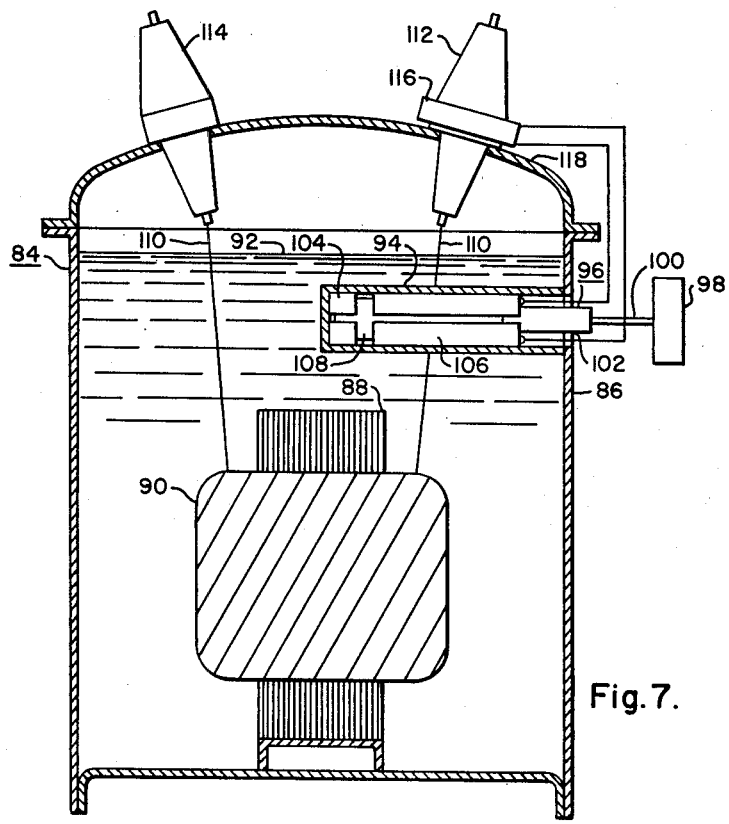
FIG. 7 is a view partly in elevation and partly in section of an oil filled electrical transformer employing an embodiment of the invention.

In FIG. 7 of the drawings, there is illustrated a partial sectional view of an electrical transformer 84 containing a cooling fluid such as a dielectric liquid 92. This transformer is provided with electrical windings 90 and a ferromagnetic core 88. The windings 90 and ferromagnetic core 88 produce heat in the normal operation of the transformer 84. The transformer 84 is enclosed in a tank 86 which contains the cooling fluid 92 such as oil. The heat produced by the normal operation of the electrical windings 90 and the ferromagnetic core 88 is transferred to the cooling fluid 92. At least one oil-tight instrument well 94 is provided in the transformer tank 86. The instrument well 94 is made of a material such as brass which is a good heat conductor. An adjustable temperature reproducer or hot spot coil 96 embodying the teachings of our invention is inserted in the instrument well 94. This embodiment of the invention utilizes a hollow electrical heating element 108 which is energized with a portion of the electrical current which passes through the electrical windings 90 of the transformer 84. A central tube 102 is provided in the hollow electrical heating element 108. A temperature responsive element 100 and its associated indicating device 98 may be inserted into the central tube 102. A movable sleeve 106 is provided in an axially spaced relationship to a fixed sleeve 104 to control the amount of heat entering the hot spot coil 96 from the well 94. The instrument well 94 may be omitted if the adjustable temperature reproducer 96 is made resistant to hot oil and pressure.

It will be understood that the temperature indicating device 98 may be remotely located and that more than one temperature indicating or control device may be actuated by temperature responsive element 100.

The transformer windings 90 may be connected to an external circuit by means of leads 110 through bushings 112 and 114. A current transformer 116 may be placed around bushing 112 to obtain a small heater current proportional to the large current flowing in the leads 110. A small size pair of wires 118 can be used to connect the current transformer 116 to the hollow electrical heating element 108.

In operation, the interior of the hot spot coil 96 is heated by the cumulative effect of the heated fluid 92 of the transformer 84 and the heat produced by the electric current flowing through the hollow electrical heating element 108. The movable sleeve 106 is adjusted by moving it away from the fixed sleeve 104 to expose enough of the outer surface of the hollow electrical heating element 108 to the hot walls of the instrument well 94 so that the temperature responsive element 100 is heated to the same temperature as the interior or so-called hot spot of electrical windings 90. As the current in the electrical windings 90 increases, so does the current in the hollow electrical heating element 108. The heat produced in the hollow electrical heating element 108 is proportional to the electric current flowing in this heating element. The cooling fluid 92 when heated by the electrical coils 90 and the ferromagnetic core 88 transmits heat to the instrument well 94 and hence to the temperature reproducer or hot spot coil 96. Therefore, the temperature indicator 98 will accurately follow the temperature in the interior of the electrical winding 90.

It will be understood that in any embodiment of our invention any suitable electric heating element may be used; the electrical heat source need not be an electric coil.

It will, therefore, be apparent that there has been disclosed a plurality of embodiments of a temperature reproducer or hot spot coil which may be adjusted to achieve a predetermined temperature difference between the inside and the outside of the device.

Since numerous changes may be made in the above-described apparatus and different embodiments may be made without departing from the spirit thereof, it is intended that all the matter contained in the foregoing description or shown in the accompanying drawings shall be interpreted as illustrative and not in a limiting sense.

We claim as our invention:

1. An adjustable heating device comprising a cylindrical tube of thermal insulation having an exterior surface exposed to ambient temperature, a hollow electrical heating element positioned coaxially within said cylindrical tube, said cylindrical tube being divided into two segments which meet at an angle of other than 90° to the longitudinal axis of the tube, one of said tube segments being held in a fixed position, the other tube segment being rotatably mounted.

2. A temperature reproducer comprising a tubular thermal insulator having an exterior surface exposed to the ambient temperature, said tubular thermal insulator being divided into segments, a hollow electric heater being positioned within said tubular thermal insulator, said tubular segments being spaced apart to expose a portion of the exterior surface of said hollow electric heater to the ambient temperature.

3. An adjustable temperature simulator comprising a tube exposed to the ambient temperature, said tube being divided into at least two segments, a hollow electric heater being positioned within said tube, at least one of said tube segments being movable to adjust the exposure of the exterior surface of the hollow electric heater to the ambient temperature.

References Cited in the file of this patent

UNITED STATES PATENTS

| | | |
|---|---|---|
| 447,143 | Ashbaugh | Feb. 24, 1891 |
| 1,917,163 | Stephens et al. | July 4, 1933 |
| 2,682,173 | Camalli | June 29, 1954 |
| 2,741,127 | Mason et al. | Apr. 10, 1956 |